United States Patent [19]

Luursema

[11] Patent Number: 5,053,680

[45] Date of Patent: Oct. 1, 1991

[54] SWITCHING DEVICE

[75] Inventor: Meerten Luursema, Eindhoven, Netherlands

[73] Assignee: U.S. Philips Corporation, New York, N.Y.

[21] Appl. No.: 524,250

[22] Filed: May 15, 1990

[30] Foreign Application Priority Data

Jun. 7, 1989 [NL] Netherlands ........................ 8901443

[51] Int. Cl.[5] ...................... H05B 41/36; H05B 37/02

[52] U.S. Cl. ................................ 315/209 R; 315/224; 315/307; 315/DIG. 7

[58] Field of Search .................... 315/209 R, 306, 307, 315/308, 291, 224, 311, 362, DIG. 7, DIG. 5

[56] References Cited

U.S. PATENT DOCUMENTS 4,156,166 5/1979 Shapiro et al. ................. 315/209 R 4,230,970 10/1980 Potter et al. ........................ 315/307

FOREIGN PATENT DOCUMENTS 3609731 9/1987 Fed. Rep. of Germany .

*Primary Examiner*—Eugene R. LaRoche
*Assistant Examiner*—Ali Neyzari
*Attorney, Agent, or Firm*—Bernard Franzblau

[57] ABSTRACT

A switching device for operating a lamp (4) by means of a pulse-shaped voltage (V1) in which switching means (3) generate the pulse-shaped voltage (V1) from an input voltage. The amplitude of the pulse-shaped voltage (V1) is proportional to the input voltage. A pulse width modulator (2) supplies control pulses to the switching means and a first auxiliary circuit (S1) generates a first signal that is derived from the pulse-shaped voltage (V1). The first signal is proportional to the average value of the pulse-shaped voltage. A control device (1) makes the first signal substantially equal to a second signal by supplying a control signal to the pulse width modulator. A second auxiliary circuit (S2) generates the second signal, which is inversely proportional to the input voltage, whereby the switching device is able to operate the lamp at a voltage with a constant effective value.

18 Claims, 1 Drawing Sheet

SWITCHING DEVICE

BACKGROUND OF THE INVENTION

This invention relates to a switching device suitable for operating a lamp by means of a pulse-shaped voltage V1, comprising switching means for generating the pulse-shaped voltage V1 from an input voltage, V1 having an amplitude proportional to the input voltage, a pulse width modulator for supplying control pulses to the switching means, a first auxiliary circuit for generating a first signal from the pulse-shaped voltage V1, this first signal being proportional to an average value of the pulse-shaped voltage V1, and a control device for making the first signal substantially equal to a second signal through the supply of a control signal to the pulse width modulator.

Such a switching device is described in U.S. Pat. No. 4,156,166. The switching device described therein compares the first signal with a second signal which is independent of the supply voltage and the condition of the lamp. The difference between these two signals is amplified, which yields the control signal supplied to the pulse width modulator.

The aim of the known switching device is to achieve a substantially constant luminous flux of the operated lamp.

The luminous flux of an incandescent lamp depends on the effective value of the voltage with which the lamp is supplied. If the lamp is supplied, for example, from a DC-voltage source, like a single cell or a battery, the voltage of which decreases in proportion to the length of time the source has been in use, the luminous flux of the lamp will decrease accordingly.

If, however, a switching device as described in the opening paragraph, supplied with an input voltage E, is used for generating a pulse-shaped voltage V1, the amplitude of which is proportional to E, and which has a duty cycle D, it is possible to have D increase to such an extent, when E decreases, that the effective value of V1 remains substantially constant. The limit of the control range of the switching device is not reached until the moment D has increased to 100%.

If an incandescent lamp is supplied by means of such a pulse-shaped voltage, the effective value of which is substantially constant, the luminous flux supplied by the lamp will also be substantially constant. A disadvantage of the known switching devices, however, is that the effective value of the pulse-shaped voltage remains constant only to a first approximation, the deviation increasing in proportion as the change in the value of the input voltage increases. An object of the invention is for its object to indicate how the switching device can be realized so that the effective value of the pulse-shaped voltage generated by the switching device remains substantially constant, even with wide variations of the input voltage.

SUMMARY OF THE INVENTION

This object is achieved in that a switching device of the type mentioned in the opening paragraph comprises a second auxiliary circuit for generating the second signal, which is inversely proportional to the input voltage. From the condition that the first signal is kept substantially equal to the second signal follows that the effective value of the pulse-shaped voltage V1 remains substantially constant.

In an advantageous embodiment of the invention, the second signal is derived from the input voltage. A simple way of realizing this is by having the second auxiliary circuit for generating the second signal comprise a switching device A for generating a pulse-shaped voltage V2 from the input voltage with a duty cycle $\delta$, an amplitude proportional to the input voltage, and a substantially constant average value, and a switching device B for generating a signal which is proportional to the duty cycle $\delta$ from the pulse-shaped voltage V2.

The duty cycle $\delta$ of the pulse-shaped voltage V2 is inversely proportional to E owing to the fact that the average value of this voltage is substantially constant. The signal generated by the switching device B, proportional to $\delta$, is thus suitable to serve as the second signal.

In a further preferred embodiment of the invention the switching device B comprises a switching device C for generating a pulse-shaped voltage V3 from the pulse-shaped voltage V2 with a duty cycle $\delta$ and a constant amplitude, and an electronic circuit F for generating a signal which is proportional to the average value of the pulse-shaped voltage V3.

Since the pulse-shaped voltage V3 has a constant amplitude and a duty cycle $\delta$, the average value of V3 is proportional to $\delta$. Thus, this embodiment of the switching device B constitutes a relatively simple and reliable device for obtaining the second signal.

An advantageous embodiment of the switching device C comprises mainly a circuit of a buffer amplifier, a resistor, and a zener diode. The constant amplitude of the pulse-shaped voltage V3 is thus realized in a very simple manner by means of the zener voltage of the zener diode.

It is furthermore advantageous if the first auxiliary circuit for generating the first signal comprises an integrating network. It is similarly advantageous if the switching device F for generating a signal proportional to the average value of the pulse-shaped voltage V3 comprises an integrating network. In both cases an integrating network provides a simple way of generating from a pulse-shaped voltage a signal which is proportional to the average value of the pulse-shaped voltage.

BRIEF DESCRIPTION OF THE DRAWING

The invention will be described in more detail with reference to the accompanying drawing of an embodiment thereof. In the drawing.

DESCRIPTION OF THE PREFERRED EMBODIMENTS

Figure 1:
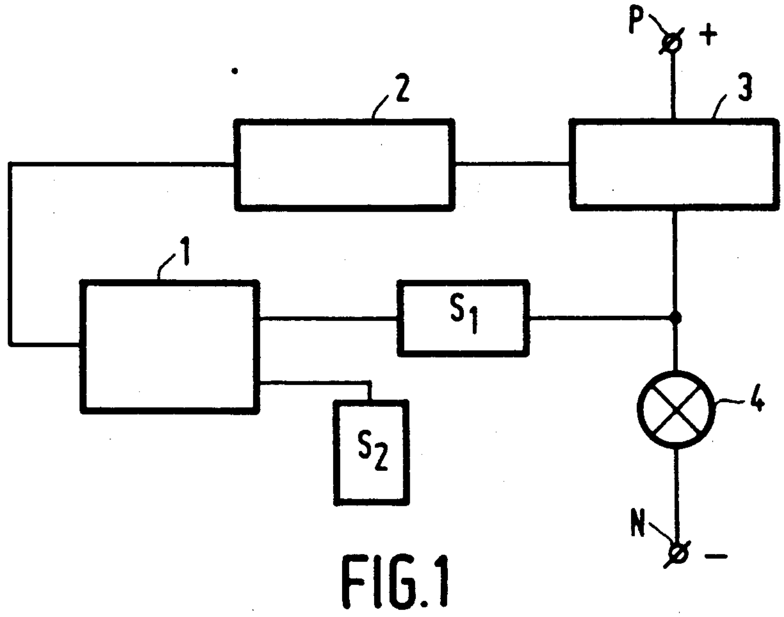
FIG. 1 is a diagrammatic representation of the arrangement of an embodiment of a switching device according to the invention and a lamp supplied by the switching device.

In FIG. 1, P and N are connection terminals suitable for connection to a positive and a negative pole, respectively, of a DC-voltage source. S1 and S2 are a first and a second auxiliary circuit for generating a first and a second signal, respectively. One output of each of these auxiliary circuits is connected to an input of a control device 1. An output of the control device 1 is connected to an input of a pulse width modulator 2. An output of the pulse width modulator 2 is connected to a control electrode of switching means 3. When the switching means 3 are conducting, there is a conducting connection between terminal P and terminal N via a lamp 4. When the switching means 3 are non-conducting, this connection is broken. A junction between the switching means 3 and the lamp 4 is connected to an input of the auxiliary circuit S1.

Figure 2:
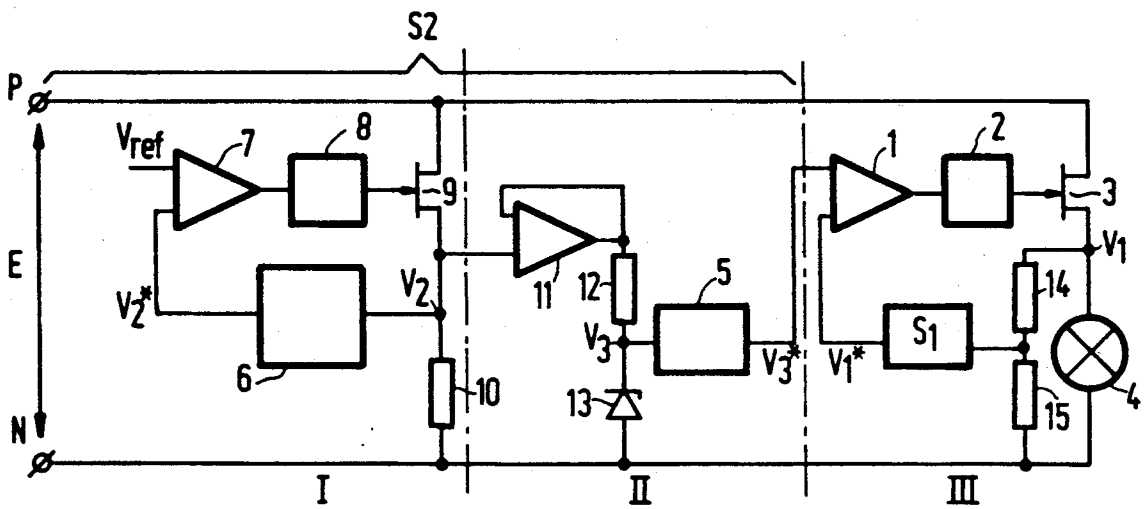
FIG. 2 shows the embodiment of FIG. 1 in more detail.

FIG. 2 has been subdivided into sections I, II, and III. Circuit elements corresponding to circuit elements in FIG. 1 have the same reference numerals. Sections I and II together form the second auxiliary circuit S2. The connection terminals are shunted by a series circuit of a semiconductor switching element 9 and a resistor 10. An input of an integrating network 6 is connected to a junction between the semiconductor switching element 9 and the resistor 10. An output of the integrating network 6 is connected to an input of a power amplifier 7. Another input of this power amplifier is connected to a reference potential Vref. An output of power amplifier 7 is connected to an input of a pulse width modulator 8, an output of which is connected to a control electrode of the semiconductor switching element 9.

Section II forms the switching device B. In section II of the switching device there is a shunt across resistor 10 consisting of a series circuit of a buffer amplifier 11, a resistor 12, and a zener diode 13, so that one input of the buffer amplifier 11 is connected to a junction between semiconductor switching element 9 and resistor 10. The anode of the zener diode 13 is connected to the input terminal N. The series circuit of the buffer amplifier 11, the resistor 12, and the zener diode 13 forms the switching device C. The input of an integrating network 5 is connected to a junction between the zener diode 13 and the resistor 12. An output of the integrating network 5 is connected to an input of the control device 1, which takes the form of a power amplifier. Integrating network 5 forms the electronic circuit F.

In section III of the switching device, the connection terminals P and N are shunted by a series circuit of the switching means 3, in the form of a semiconductor switching element, and a lamp 4, in such a way that a main electrode of the semiconductor switching element is connected to the input terminal P. The lamp 4 is shunted by a series circuit of two resistors 14 and 15. An input of the first auxiliary circuit S1, which forms an integrating network, is connected to a junction between resistor 14 and resistor 15. An output of the first auxiliary circuit S1 is connected to an input of the power amplifier 1. An output of power amplifier 1 is connected to an input of the pulse width modulator 2. The output of the pulse width modulator 2 is connected to a gate electrode of the semiconductor switching element 3.

Figure 3:
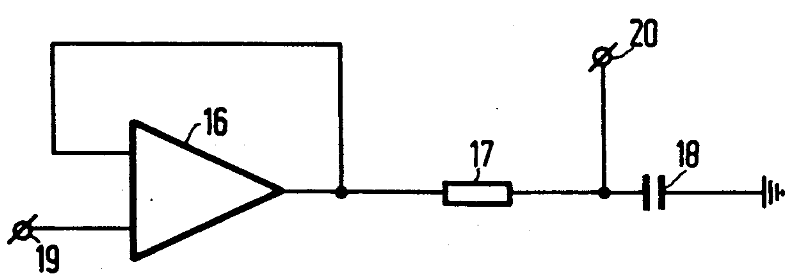
FIG. 3 shows a preferred embodiment of an integrating network which forms a part of the switching device according to FIG. 2.

An integrating network is shown in FIG. 3 and consists of as a circuit which includes a buffer amplifier 16, a resistor 17, and a capacitor 18. Terminal 19 is an input terminal and terminal 20 is an output terminal of the network. Integrating networks 5 and 6 and the first auxiliary circuit S1 have been arranged in the configuration shown in FIG. 3.

The switching device described above operates s follows.

If a DC-voltage source with a voltage E is connected to terminals P and N, the semiconductor switching element 9 in section I of the switching device is alternately conducting and non-conducting with a duty cycle δ. The result is that a pulse-shaped voltage V2 is present across resistor 10 having an amplitude substantially equal to E and a duty cycle δ. A DC-voltage V2* at the output of the integrating network 6 is proportional to the average value of V2, which is δ.E. The reference potential Vref is constant. The combination of the power amplifier 7 and the pulse width modulator 8 controls the duty cycle δ of the semiconductor switching element 9 in such a way that the DC-voltage V2* is kept substantially constant, so that δ is inversely proportional to E.

In section II of the switching device, a pulse-shaped voltage V3 is present, which is derived from the pulse-shaped voltage V2 by means of the circuit elements 11, 12, and 13, with a duty cycle δ and an amplitude which is independent of the input voltage E and equal to the zener voltage of the zener diode 13. At the output of the integrating network 5 there is a DC-voltage V3*, which is proportional to the average value of V3. Since the amplitude of V3 is constant, V3* is proportional to δ so that V3* can act as the second signal.

In section III of the switching device, the semiconductor switching element 3 is alternately conducting and non-conducting with a duty cycle D. Thus, a pulse-shaped voltage V1 with a duty cycle D and an amplitude E is present across the lamp 4. A DC-voltage V1* is derived from V1 by means of the circuit elements 14, 15, and S1. This DC-voltage, present at the output of integrating network S1, is proportional to the average value of V1, which is D.E., and forms the first signal. The combination of the power amplifier 1 and the pulse width modulator 2 determines the duty cycle D in such a way that the DC-voltage V1* is kept substantially equal to V3*, which ensures that D.E is substantially proportional to δ in section III of the switching device.

Since δ is inversely proportional to E, it is now true that D.E^2 is substantially constant, so that the effective value of the voltage across the lamp (D^(½) .E) is also constant. The Table below gives the relationship between the input voltage E of a supply voltage source and the effective value of the pulse-shaped voltage V1, Vlamp (eff), as it was measured in a practical version of the embodiment considered. The lamp used was a halogen incandescent lamp (12 V, 55 W).

| E (V) | Vlamp (eff) (V) |
|---|---|
| 13.6 | 12.00 |
| 14.0 | 11.99 |
| 15.0 | 11.96 |
| 17.0 | 11.90 |
| 19.0 | 11.84 |
| 21.0 | 11.80 |
| 24.0 | 11.74 |

I claim:

1. A switching device for operating a lamp by means of a pulse-shaped voltage (V1), comprising:

switching means for generating the pulse-shaped voltage (V1) from an input voltage and with the amplitude thereof proportional to the input voltage, a pulse width modulator for supplying control pulses to the switching means, a first auxiliary circuit for generating a first signal derived from the pulse-shaped voltage, said first signal being proportional to an average value of the pulse shaped voltage (V1), a control device responsive to the first signal and to a second signal for making the first signal substantially equal to the second signal by the supply of a control signal to the pulse width modulator, and a second auxiliary circuit for generating the second signal in a manner whereby the second signal is inversely proportional to the input voltage.

2. A switching device as claimed in claim 1, wherein the second auxiliary circuit comprises:

a switching device (A) for generating a pulse-shaped voltage (V2) from the input voltage and with a duty cycle δ, an amplitude proportional to the input voltage, and a substantially constant average value, and a switching device (B) for generating a signal proportional to the duty cycle δ from the pulse-shaped voltage (V2).

3. A switching device as claimed in claim 2, wherein the switching device (B) comprises:

a switching device (C) for generating a pulse-shaped voltage (V3) from the pulse-shaped voltage (V2) with a duty cycle δ and a constant amplitude, and an electronic circuit (F) for generating a signal which is proportional to an average value of the pulse-shaped voltage (V3).

4. A switching device as claimed in claim 3, wherein the switching device (C) comprises a power amplifier, a resistor, and a zener diode.

5. A switching device as claimed in claim 3, wherein the first auxiliary circuit comprises an integrating network.

6. A switching device as claimed in claim 3, wherein electronic circuit comprises an integrating network.

7. A switching device as claimed in claim 1, wherein the first auxiliary circuit comprises an integrating network having its input coupled to the lamp so as to be responsive to said pulse-shaped voltage.

8. A switching device as claimed in claim 1, wherein said first auxiliary circuit is part of a feedback network coupled between an output of the control device and an input thereof.

9. A switching device as claimed in claim 8, wherein said feedback network includes said pulse width modulator.

10. A switching device as claimed in claim 1, wherein said first auxiliary circuit is part of a feedback network coupled between a terminal of the lamp at which the pulse-shaped voltage is developed and an input of the control device for the first signal.

11. Apparatus for operating a lamp comprising:

an output terminal for connection of the lamp, first and second input terminals for a DC operating voltage for said apparatus, a controlled switching means coupled to the output terminal and to the input terminals such that when a lamp is connected to the output terminal, the switching means and the lamp form a series circuit across the input terminals, control means having an output coupled to a control electrode of the controlled switching means for supplying control pulses thereto for switching the switching means on and off to develop a pulse-type voltage at said output terminal for energizing a lamp during operation of the apparatus, a first auxiliary circuit coupled between said output terminal and a first input of the control means to supply thereto a first signal that is proportional to the average value of the pulse-type voltage at the output terminal, a second auxiliary circuit coupled to said input terminals and including means for generating a second signal that is inversely proportional to the DC operating input voltage at said input terminals, and means coupling said second signal to a second input of the control means, and wherein said control means supplies said control pulses to said controllable switching means so as to make the first signal equal to the second signal.

12. An apparatus as claimed in claim 11, wherein said first auxiliary circuit includes an integrating network as part of a feedback circuit coupled between said output terminal and the first input of the control means.

13. An apparatus as claimed in claim 12, wherein the second auxiliary circuit comprises:

a first switching device coupled to the input terminals for deriving a second pulse-type voltage (V2) having a duty cycle δ and an amplitude proportional to the input voltage, means responsive to said second pulse-type voltage for deriving a DC control voltage proportional to the average value of the second pulse-type voltage and which controls the operation of said first switching device, and a second switching device responsive to the second pulse-type voltage for generating a further control signal proportional to said duty cycle δ and from which further control signal said second signal is generated.

14. An apparatus as claimed in claim 13, wherein the second switching device generates said further control signal as a third pulse-type voltage (V3) of constant amplitude and with said duty cycle δ, said second switching device further comprising, a second integrating network responsive to said third pulse-type voltage for producing said second signal and with the second signal proportional to the average value of said third pulse-type voltage.

15. An apparatus as claimed in claim 11, wherein the second auxiliary circuit comprises:

a first switching device coupled to the input terminals for deriving a second pulse-type voltage (V2) whose amplitude is proportional to the input voltage and having a duty cycle δ that is inversely proportional to the input voltage, means responsive to said second pulse-type voltage for deriving a DC voltage which controls the operation of said first switching device, and a second switching device responsive to the second pulse-type voltage for generating a signal proportional to the duty cycle δ.

16. Apparatus as claimed in claim 15, wherein the second switching device includes means for generating a third pulse-type voltage (V3) of constant amplitude and with the duty cycle δ, and means responsive to said third pulse-type voltage for deriving as said second signal a voltage which is proportional to the average value of the third pulse-type voltage.

17. An apparatus as claimed in claim 16, wherein said first auxiliary circuit comprises an integrating network having an input coupled to the output terminal and an output coupled to the first input of the control means.

18. An apparatus as claimed in claim 11, wherein said lamp comprises a halogen lamp.

* * * * *

UNITED STATES PATENT AND TRADEMARK OFFICE

CERTIFICATE OF CORRECTION

PATENT NO. : 5,053,680

DATED : October 1, 1991

INVENTOR(S) : Meerten Luursema

It is certified that error appears in the above-indentified patent and that said Letters Patent is hereby corrected as shown below:

Column 1, line 56, delete "for its object".

Signed and Sealed this

Twenty-first Day of June, 1994

Attest:

BRUCE LEHMAN

Attesting Officer

*Commissioner of Patents and Trademarks*